(12) United States Patent
Knapp et al.

(10) Patent No.: US 6,532,823 B1
(45) Date of Patent: *Mar. 18, 2003

(54) INSULATOR LAYERS FOR MAGNETORESISTIVE TRANSDUCERS

(75) Inventors: Kenneth E. Knapp, Livermore, CA (US); Liubo Hong, San Jose, CA (US); Robert E. Rotmayer, Wexford, PA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/272,648

(22) Filed: Mar. 18, 1999

(51) Int. Cl.$^7$ ............................... G01B 7/16; G01L 1/00
(52) U.S. Cl. ...................................................... 73/779
(58) Field of Search .................... 73/779, 643, 623, 73/766; 381/431, 202, 203, 158; 310/28; 179/100; 181/172; 585/352; 148/32; 360/314, 113, 320, 126, 325, 315

(56) References Cited

U.S. PATENT DOCUMENTS

| | | | | |
|---|---|---|---|---|
| 3,945,038 A | * | 3/1976 | Lazzari ........................ 360/113 |
| 4,104,922 A | * | 8/1978 | Alers et al. ..................... 73/643 |
| 5,171,732 A | | 12/1992 | Hed ................................ 505/1 |
| 5,279,723 A | | 1/1994 | Falabella et al. ......... 204/192.38 |
| 5,331,493 A | | 7/1994 | Schwarz ...................... 360/113 |
| 5,374,318 A | * | 12/1994 | Rabalais et al. ............... 148/33 |
| 5,563,754 A | | 10/1996 | Gray et al. ................... 360/126 |
| 5,609,948 A | | 3/1997 | David et al. ................. 428/216 |
| 5,627,903 A | * | 5/1997 | Porrazzo et al. ............. 381/202 |
| 5,644,455 A | | 7/1997 | Schultz ........................ 360/113 |
| 5,644,456 A | * | 7/1997 | Smith et al. ................. 360/113 |
| 5,684,658 A | | 11/1997 | Shi et al. ..................... 360/113 |
| 5,731,936 A | | 3/1998 | Lee et al. .................... 360/113 |
| 5,783,460 A | * | 7/1998 | Han et al. ....................... 438/3 |
| 5,793,576 A | | 8/1998 | Gill ............................. 360/113 |
| 5,801,909 A | | 9/1998 | Gray et al. ................... 360/126 |
| 5,822,153 A | | 10/1998 | Lairson et al. ............... 360/104 |
| 5,859,754 A | * | 1/1999 | Tong et al. ................... 360/113 |
| 5,953,438 A | * | 9/1999 | Stevenson et al. ........... 381/431 |
| 6,118,638 A | * | 9/2000 | Knapp et al. ................. 360/314 |

OTHER PUBLICATIONS

D.A. Baldwin et al., "Deposition Processes Utilizing a New Filtered Cathodic Arc Source," Society of Vacuum Coaters, 38$^{th}$ Annual Technical Conference Proceedings (1995), pp. 309–316.

S. Anders et al., "S–Shaped Magnetic Macroparticle Filter for Cathodic Arc Deposition," IEEE Transactions on Plasma Science, vol. 25, No. 4, Aug. 1997, pp. 670–674.

Advertisement of Commonwealth Scientific Corp., "Don't Get Caught with a Carbon Copy," Data Storage Magazine, Jun. 1998.

* cited by examiner

Primary Examiner—Max Noori
(74) Attorney, Agent, or Firm—Mark Lauer

(57) ABSTRACT

A magnetoresistive (MR) transducer has at least one insulative layer made of tetrahedral amorphous carbon (ta-C). The ta-C layer is formed by filtered cathodic arc deposition, has an essentially zero concentration of hydrogen and can serve as a read gap for the transducer. The hydrogen-free t-aC read gap has high thermal conductivity, keeping an adjoining MR sensor from overheating during operation. This extends sensor lifetimes and/or improves sensor performance. The read gap also has low defects and porosity, preventing unwanted electrical conduction or shorting between a sensor and a shield. The high hardness of the read gap resists plasma and chemical etching processes such as ion milling that are used to form the sensor. The increased hardness and reduced defects and porosity allow the read gaps to be made thinner without risking electrical shorting. Other hydrogen-free t-aC layers are employed for other sensor elements where electrical insulation and reduced thickness are important.

23 Claims, 5 Drawing Sheets

INSULATOR LAYERS FOR MAGNETORESISTIVE TRANSDUCERS

TECHNICAL FIELD

The present invention relates to electromagnetic transducers or heads, and particularly to transducers that employ a magnetoresistive mechanism for sensing signals.

BACKGROUND OF THE INVENTION

The employment of magnetoresistive (MR) elements as sensors for electromagnetic transducers has led to improved performance of heads used in disk and tape drives. As is well known, the resistance of an MR element varies according to the magnetic field impinging upon the element, so that flowing an electric current through the element can be used to determine that magnetic field by measuring the change in resistance.

While bulk materials may exhibit some MR effect, such effects generally become more pronounced as an element becomes smaller relative to the applied electrical and magnetic flux. Thus it is known that films formed of materials such as Permalloy, which is an alloy of nickel and iron having a high permeability and low coercive force, can be useful as sensors for heads when the film thickness is less than about 500 Å. Even thinner films exhibit quantum mechanical effects which are be utilized in types of MR sensors such as spin valve (SV) or giant magnetoresistive (GMR) sensors. Higher storage density associated with smaller recorded bit size also usually requires smaller MR elements.

Generally speaking, the thinner the film used for MR sensing, the more important that the film have a uniform thickness and structure. As such, the material surface or template upon which the film is formed is important. Heads for hard disk drives typically position an MR sensor between a pair of magnetic shields, with the sensor separated from the shields by electrically insulative and nonmagnetic read gaps. The conventional material forming read gaps is aluminum oxide ($Al_2O_3$), which is known to be easy to form and work with, and which provides a suitable template for forming thin MR films. $Al_2O_3$, however, has a strong affinity for moisture and tends to be porous, both of which can undermine the quality and integrity of an adjoining MR sensor.

U.S. Pat. No. 5,644,455 to Schultz describes forming an MR head read gap of "diamond-like carbon" or "DLC", which is an hydrogenated carbon formed from a gas such as methane ($CH_4$), the DLC having a hydrogen content of 30 to 50 percent. DLC is known to be a hard, thermally conductive, electrically insulative material. DLC also has a high stress, however, making formation of a delicate MR sensor atop a DLC gap difficult.

In an article entitled Ultra-Thin Overcoats For The Head/Disk Interface Tribology, Bhatia et al. propose the use of cathodic arc deposition of carbon to form a coating for a slider or disk. This technique had formerly been used for forming a hard coating on metal tools, and involves melting and vaporizing a carbon cathode with a plasma arc, and directing the carbon ions and particles ejected from the cathode toward a target. Although filters can remove most particles, the resulting films may be rough and have much higher stress than DLC, making even adhesion to a substrate problematic.

SUMMARY OF THE INVENTION

The present invention involves forming thin layers of tetrahedral amorphous carbon (t-aC) for MR sensors. The layers of t-aC have essentially zero concentration of hydrogen and can serve as read gaps for the sensors. Such a hydrogen-free t-aC read gap has an improved thermal conductivity that helps to keep an adjoining MR sensor from overheating during operation. This improved thermal conductivity of the read gap can extend sensor lifetimes and/or improve sensor performance. Hydrogen-free t-aC has a thermal conductivity that may be more than double that of conventional DLC and more than ten times that of $Al_2O_3$.

Moreover, the hydrogen-free t-aC read gap of the present invention has reduced defects and porosity, which prevents unwanted electrical conduction or shorting between a sensor and a shield. Hydrogen-free t-aC also is much harder than DLC, which in turn is known to be many times harder than $Al_2O_3$. This extreme hardness renders the read gap layers of the present invention impervious to plasma and chemical etching processes such as ion milling that are used to form the sensor. The increased hardness and reduced defects and porosity allow the read gaps to be made thinner without risking electrical shorting.

The effects of the inherently high stress of the hydrogen-free t-aC layers can be minimized by keeping the read gap thickness preferably less than a few hundred angstroms, avoiding adhesion problems that such high stress might otherwise cause. While such thin read gaps cannot be made reliably with conventional materials due to shorting and other problems, the hydrogen-free t-aC read gaps of the present invention can form read gaps as thin as twenty angstroms. Such thin read gaps can improve the focus of the sensor and shorten the path to heat sinks provided by the shields, further improving performance.

Thin t-aC layers of the present invention can be beneficially employed for sensor elements beside read gaps. For example, a thin t-aC layer can be used to separate a magnetoresistive layer from an adjacent bias layer for an anisotropic magnetoresistive sensor. In addition, a relatively thin t-aC layer can be disposed between plural sensors of a dual stripe MR head. In these examples as well as others the relatively thin t-aC layers offer performance improvements that include increased resolution and reliability.

DESCRIPTION OF THE INVENTION

Figure 1:
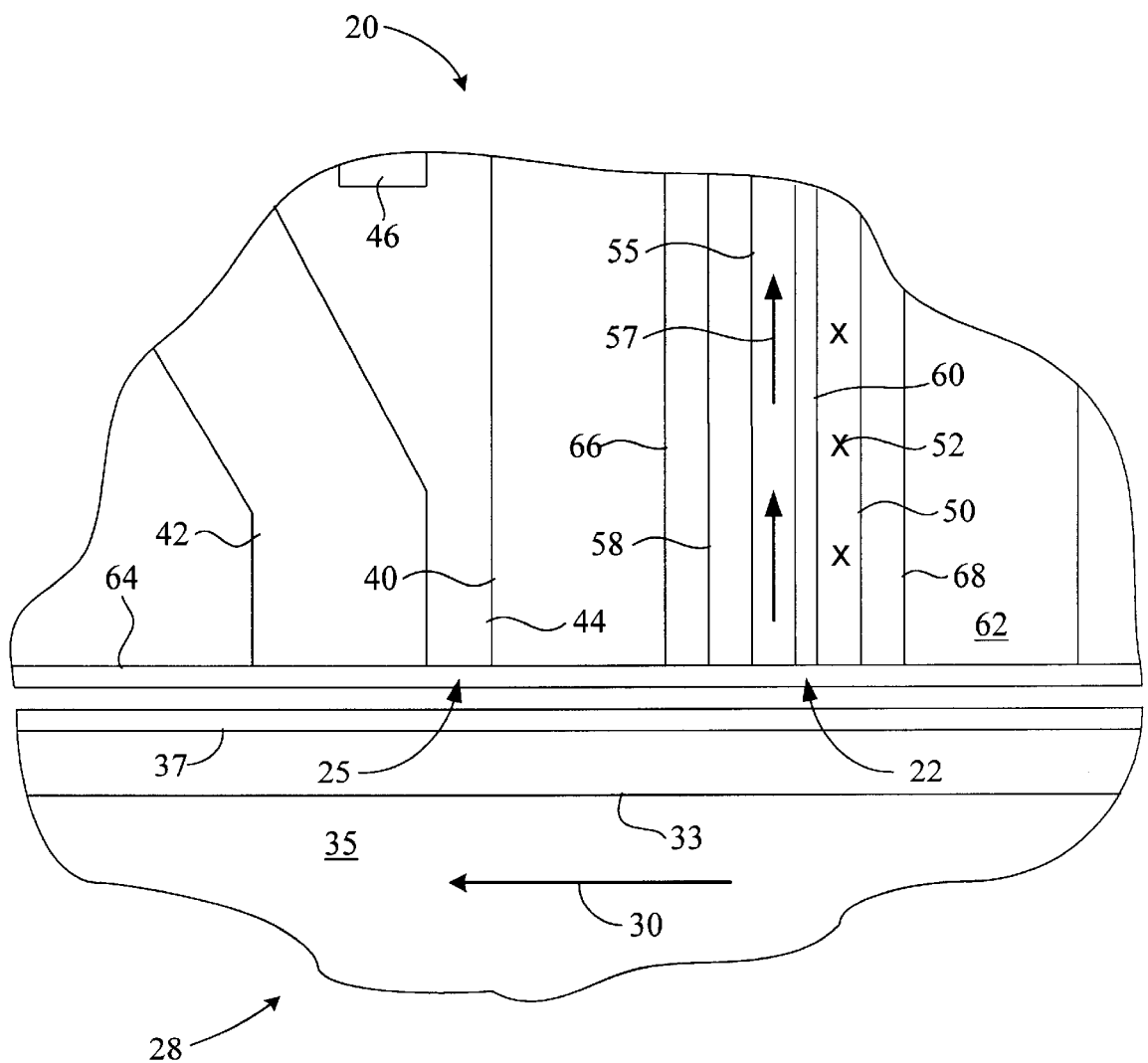
FIG. 1 is a cross-sectional view of a reading and writing head of the present invention including a magnetoresistive sensor having thin, hydrogen-free t-aC read gaps that closely focus the sensor on a relatively moving media.

FIG. 1 shows a head 20 of the present invention including a magnetoresistive read transducer 22 and an inductive write transducer 25, the head disposed in close proximity to a media 28 which is moving relative to the head as shown by arrow 30. The media 28 may be a disk or tape, for example, which includes media layer 33 or layers atop a substrate 35, with an overcoat layer 37 protecting the media. The write transducer 25 includes a first write pole 40 and a second write pole 42, the poles including magnetically permeable material such as an NiFe alloy and being separated by a write gap 44 made of a nonmagnetic, electrically insulative material such as $Al_2O_3$. The write poles 40 and 42 are ends of a pair of write layers that form a magnetic circuit or loop to encourage the flow of magnetic flux across the write gap. An electrically conductive coil 46 is located between the write layers, a part of which is shown, so that an electrical current flowed through the coil induces a magnetic flux in the write layers that travels across the nonmagnetic gap 44 to write a magnetic bit in the media layer 33.

The sensor 22 includes a first layer 50 of magnetic material such as NiFe, NiFe/Co or NiFe/CoFe that is biased with a magnetic direction pointing into the page and essentially perpendicular to both the head and media layers, as shown by X-marks 52. The magnetization of first layer 50 is free to rotate within the plane of that layer in response to magnetic fields from the media. A second layer 55 of magnetic material such as NiFe, NiFe/Co, NiFe/CoFe or Co has a magnetization that is pinned in a direction shown by arrows 57. The pinned layer 55 may have its magnetization fixed by an adjoining antiferromagnetic layer 58. The first and second magnetic layers are separated by a conductive nonmagnetic layer 60, which may be formed of copper or gold for instance. A magnetic shield 62 is disposed adjacent to the sensor 22, which acts along with write pole 40 to focus the sensor 22 on media fields directly opposite the sensor, by shielding the sensor from magnetic fields emanating from other portions of the media. The shield may be formed of a magnetic material such as NiFe or other known materials. The head 20 has a media-facing surface that is coated with a layer 64 of t-aC to protect the sensor 22.

During operation, an electric current flows through the conductive layer 60, and the resistance to that current is decreased or increased depending upon whether the free layer 50 magnetization is more or less parallel with the pinned layer, the free layer magnetization rotating based upon signals from the media. Although the mechanism for varying magnetoresistance may not be fully understood, it is believed that when the magnetization of the free and pinned layers are parallel, electrons in the current are more free to cross the interfaces between the conductive layer 60 and the free and pinned layers, essentially broadening the conductive cross-section and lowering resistance. When the magnetization of the free and pinned layers are antiparallel, on the other hand, electrons in the current are restricted from crossing the interfaces between the conductive layer 60 and the free and pinned layers, essentially narrowing the conductive cross-section and increasing resistance. A voltage difference thus may sensed based upon whether magnetic spins of electrons in the free and pinned layers are more or less parallel, earning this type of magnetoresistive sensor the name spin-valve sensor.

Separating the sensor 22 from NiFe layers 40 and 62 are layers 66 and 68 of hydrogen-free t-aC. The t-aC layers 66 and 68 are preferably formed by filtered cathodic arc deposition, as will be explained in more detail below. The layers 66 and 68 can be much thinner than conventional read gap materials while maintaining electrical insulation between the sensor 22 and shields 40 and 62. Current design specifications for the thickness of t-aC layers such as layers 66 and 68 can range between about 100 Å and 500 Å, although the t-aC read gaps of the present invention may be formed to thicknesses between about 10 Å and 100 Å, and such thinner gaps are likely to be employed in the future. Such thin read gaps can help the sensor focus more accurately on fields from individual media bits, enhancing resolution and allowing greater areal density of stored information. Forming thinner read gaps also helps to keep the high-stress t-aC from peeling away from the shield or sensor, as one might have otherwise expected for a read gap of highly stressed t-aC formed to a conventional thickness of about 1000 Å.

The improved thermal conductivity of hydrogen-free t-aC read gaps helps to keep the sensor from overheating during operation. The relatively thin read gaps also provide a short path for heat from the sensor to travel before reaching the heat sinks provided by the shields. This improved thermal conductivity and heat transfer of the read gaps can extend sensor lifetimes, since diffusion of sensor materials which can degrade and eventually destroy a sensor generally proceeds at a higher rate at higher temperatures. Lower temperature sensor operation afforded by the read gaps of the present invention may extend sensor lifetimes several fold. Alternatively, a sensor may be operated at conventional temperatures but with increased current, since the increased thermal conductivity of the read gaps allows the greater heat that is produced by that higher current to be better dissipated. This higher current provides greater voltage output for a given change in resistance felt by the sensor, magnifying signal output. Overall sensor performance can be improved by operating at lower temperatures and/or higher current. The hydrogen-free t-aC layers of the present invention can have a thermal conductivity that is more than double that of conventional DLC and more than ten times that of $Al_2O_3$.

The read gaps such as layers 66 and 68 preferably are composed of a type of diamond-like carbon having zero hydrogen content according to secondary ion mass-spectroscopy measurements, although the inventors recognize that trace amounts of hydrogen (up to about three percent) may be tolerable. Carbon has a natural affinity for hydrogen in forming $sp^3$ bonds rather than $sp^2$ bonds such as graphite, and so the formation of defect-free $sp^3$-bonded carbon that is substantially devoid of hydrogen is not trivial. Although t-aC is labeled amorphous, a large majority (over 80%) of the carbon in the t-aC layers of the present invention may be polycrystalline. Thus a more accurate characterization of the t-aC material formed in the present invention may be that of carbon having primarily tetrahedral molecular bonds that is substantially devoid of hydrogen.

The t-aC deposition of layer 68 is preferably highly filtered to provide a smooth template for the sensor. Otherwise, any roughness of the read gap 68 is likely replicated in sensor layers 50, 55 and 60. Such roughness would be expected to cause electron scattering at the interfaces between those layers 50, 55 and 60 regardless of any field from the media, increasing noise and lowering signal resolution and thereby denigrating sensor performance. The finding that filtered t-aC could be used for such a sensitive initial layer of a sensor was surprising. On the other hand, formation of layer 68 has an advantage over that of layer 66 since layer 68 is buried further by sensor 22 when the wafer upon which the layers are being formed is removed from a cathodic arc formation chamber for electroplating, and so layer 68 may be less prone than layer 66 to delamination caused by the high stress of t-aC. Although preferable to form both read gap layers 66 and 68 from hydrogen-free t-aC, it is possible to form only one of those layers 66 or 68 from this material and still obtain important benefits, while avoiding some of the challenges of using this material for both layers.

Figure 2:
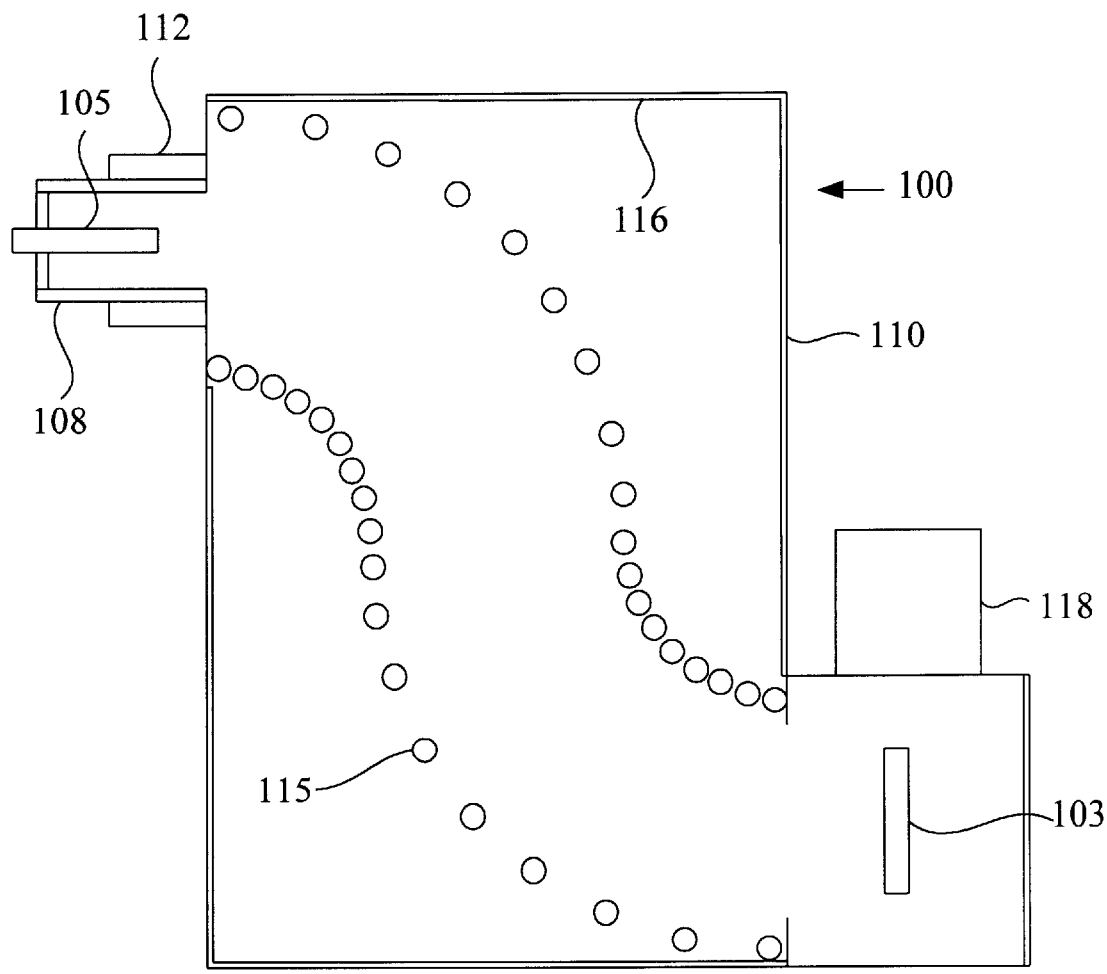
FIG. 2 is a schematic view of a filtered cathodic arc apparatus used for producing the t-aC read gaps of the present invention.

FIG. 2 shows an apparatus 100 for forming essentially pure carbon having a primarily tetrahedral bond structure on a substrate 103 on which thousands of sensors are being formed. A carbon cathode 105 is surrounded by an anode 108, the anode and cathode separated by a vacuum in a chamber 110 that includes the substrate. The cathode 105 and anode 108 are provided greatly different voltages such that an arc of current is generated that flows from one to the other. A focusing solenoid 112 wraps around the anode to direct carbon ions generated by the arc outward from the anode and cathode. The chamber includes a serpentine guiding solenoid 115 that filters out most macroparticles that are generated by the arc, while guiding the carbon ions toward the substrate. The filtering occurs since the charge to mass ratio of the carbon ions is much higher than that of the macroparticles, which causes the ions to be guided through the path defined by the magnetic field within serpentine solenoid 115, while the macroparticles fly out of that path.

A more detailed description of such an apparatus can be found in an article entitled: "S-Shaped Magnetic Macroparticle Filter For Cathodic Arc Deposition," by Anders et al. in *IEEE Transactions on Plasma Science*, Vol. 25, No. 4, August 1997, pp. 670–674, which is incorporated herein by reference. Other cathodic arc apparatuses may instead be employed, such as a 45° solenoid filter, which is described, in U.S. Pat. No. 5,279,723 to Falabella et al., which is also incorporated herein by reference. An inner wall of the chamber 110 may be fitted with a lining 116 that traps the macroparticles so that they do not bounce back into the path of the guiding solenoid 115. An adjoining chamber 118 may be opened for a separate step of providing sputtered NiFe or other materials used for forming magnetoresistive sensors, with the carbon source walled off and the substrate rotated to face that chamber 118. Although a single chamber 118 is shown for brevity and clarity, similar chambers for forming other sensor materials, for example Cu or FeMn, may also adjoin the chamber 110.

Figure 3:
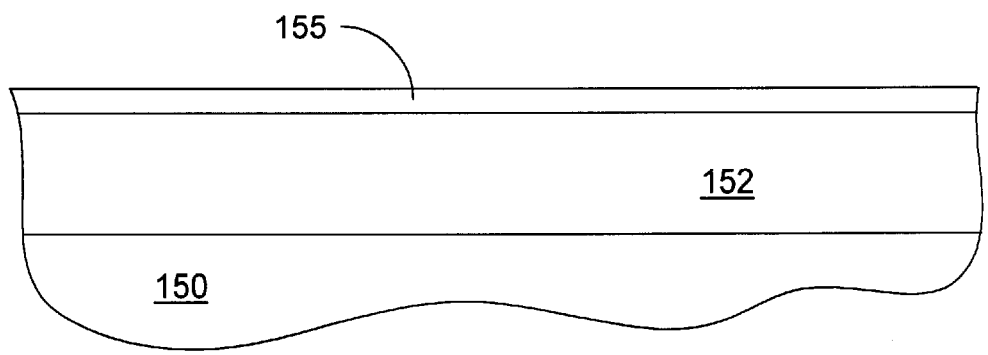
FIG. 3 is a cross-sectional view of the formation of a first t-aC read gap of the present invention.

FIG. 3 shows a small portion of a wafer substrate 150 on which many thousand sensors of the present invention may be formed. A shield 152 of Permalloy or similar material has been formed on the substrate, for instance by sputtering a seed layer followed by electroplating the remainder of layer 152. After polishing and cleaning of the surface of shield 152, a layer 155 of essentially hydrogen-free carbon having primarily tetrahedral bonds is formed on the shield using an apparatus such as shown in FIG. 2. Layer 155, which is designed to become a read gap layer for the sensors, is formed by initially providing a large bias between the cathode and the substrate, which may help to clean the shield 152 as well as implanting carbon ions in the shield and adhering the carbon layer to the shield layer. This initial bias voltage may range between about −100 V and −2000 V, and is preferably about −1000 V. During this optional initial stage, which may last between about 20 seconds to about 2 minutes depending upon factors such as the arc current, bombardment by high-energy carbon ions may etch the shield layer 152 slightly, or may result in zero or slight growth as shield atoms or ions are replaced with or infused with carbon ions or atoms. The bias between the target and substrate is then reduced to a range between about −50 V and −500 V, and preferably approximately −100 V, which is believed to favor formation of sp3 bonds in layer 155. In order to reduce the possibility of macroparticle impingement into layer 155, further filtering may be employed. For instance, the substrate 103 may be turned about 90°, more or less, from the orientation shown in FIG. 2 so that the relatively massive macroparticles fly past the substrate while carbon ions are diverted to the shield layer 152 by the bias voltage. Depending upon the desired application, the thickness of layer 155 may range between about 20 Å and 500 Å.

Figure 4:
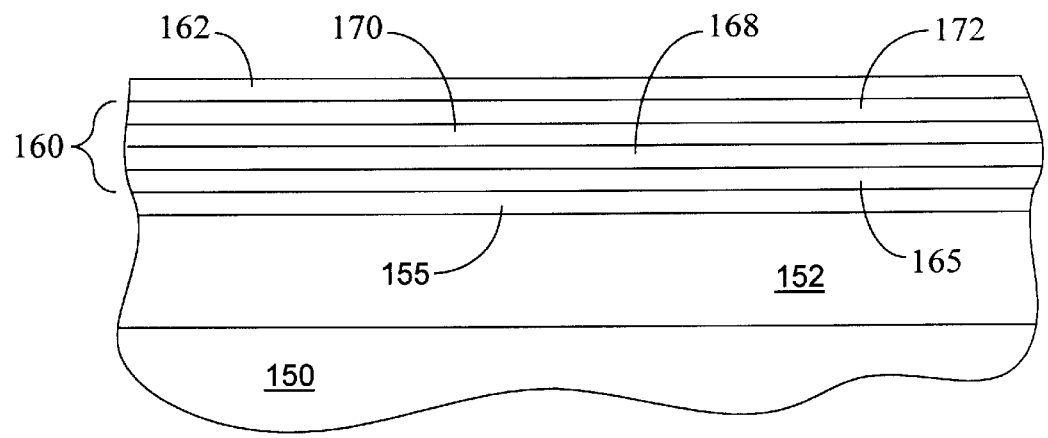
FIG. 4 is a cross-sectional view of the formation of plural sensor layers and a second t-aC read gap atop the first t-aC read gap.

In FIG. 4, a number of sensor layers 160 have been formed atop the t-aC layer 155, followed by an optional t-aC layer 162 that protects the sensor layers, provides a hard top which after etching results in a blunter end to the sensor layers, and which forms a part of another read gap. In a chamber such as 118 of FIG. 2, a layer 165 of NiFe or other magnetically permeable material is sputtered onto layer 155, after evacuating carbon plasma from the chamber containing the wafer substrate and facing the substrate toward the NiFe source. A nonmagnetic, electrically conductive layer 168 made of a material such as Au or Cu is then similarly formed on top of layer 165, which is immediately followed by another layer 170 of NiFe. An antiferromagnetic layer 172 such as FeMn is then formed atop layer 170 for pinning layer 170. This figure provides an example of one arrangement of sensor layers 160 for a spin valve sensor, while other known types of sensors may instead be created. Optional layer 162, which may be formed of t-aC by cathodic arc deposition, may have a thickness less than that of layer 155 and in a range between about 10 Å and 100 Å.

Figure 5:
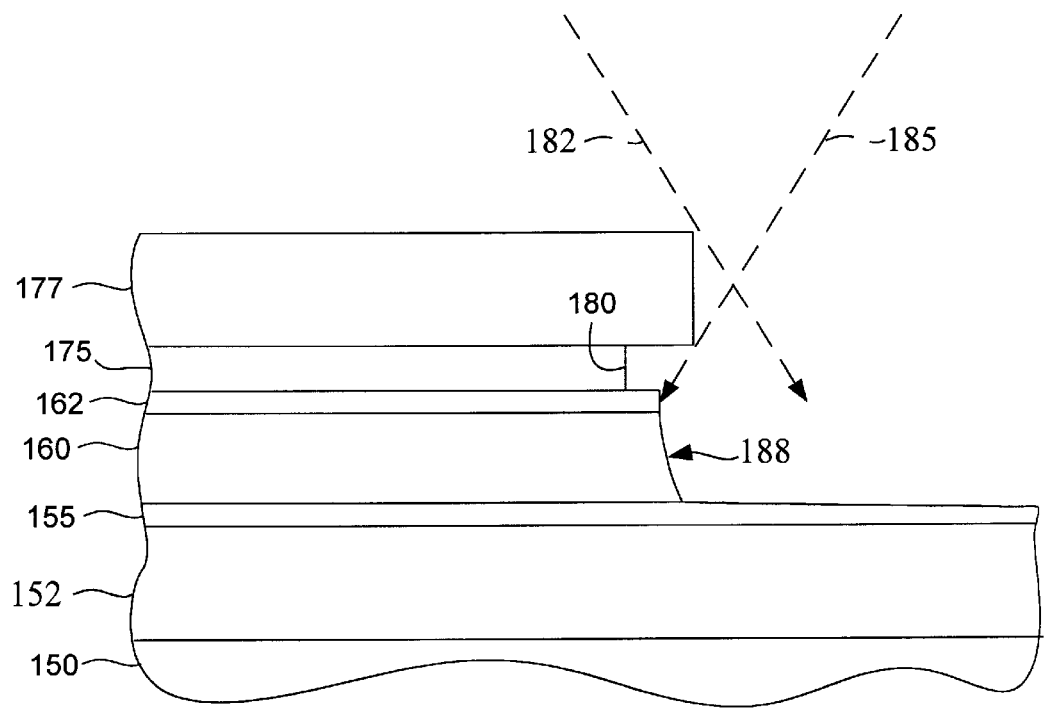
FIG. 5 is a cross-sectional view of a masked etching step that forms an end to the sensor layers by rotating ion beam milling.

FIG. 5 depicts an ion beam etching (IBE) step in forming sensors of the present invention. Prior to this step, a resist having two layers 175 and 177 has been photolithographically patterned atop the t-aC read gap layer 162, leaving an undercut 180 closest to the sensor. The undercut has been formed by selectively etching layer 175 compared to layer 177. An IBE is directed at a relatively rotating angle to the substrate, as shown by lines 182 and 185, forming a curved border 188 of the sensor layers 160. The IBE may also remove a small part of the read gap layer 155, but due to the extreme hardness of the semi-amorphous diamond forming that layer 155, relatively little of the read gap is removed. The undercut 180 and angled IBE allow etchant to remove the mask layers 175 and 177 after deposition of a hard bias and lead layers that cover the mask layers as well as adjoin the border 188 to form a contiguous junction. The border 188 has a much steeper slope than is conventional, which is advantageous for magnetic domains that may be formed in the sensor layers 160 as well as for providing bias fields via the border 188. Further, the steep slope of border 188 removes ambiguity in the width of the sensor, allowing the sensor to more accurately match (or undercut) the width of media tracks, reducing noise and increasing resolution as noted in a commonly assigned application entitled MR Sensor with Blunt Contiguous Junction and Slow-Milling-Rate Read Gap, invented by Hong et al., filed on even date herewith and incorporated herein by reference.

Figure 6:
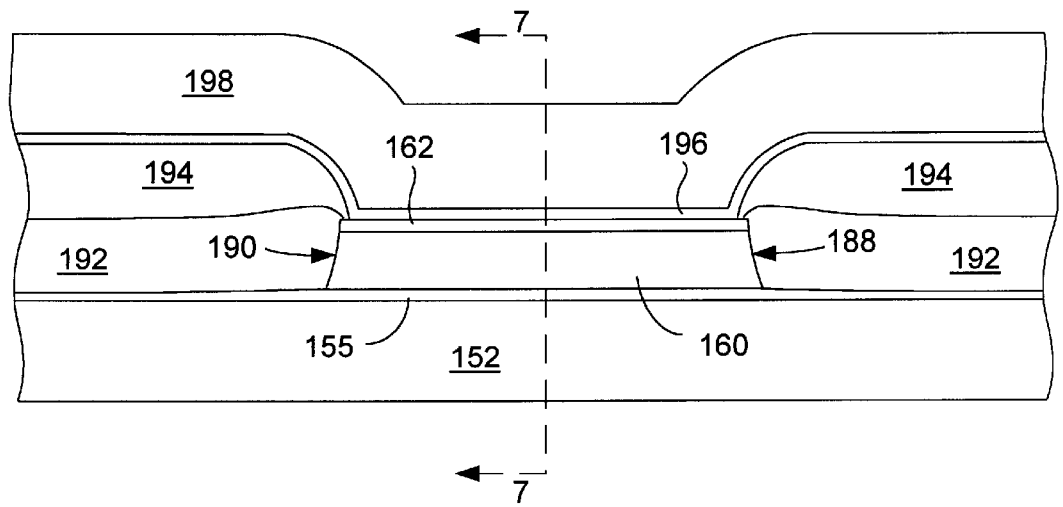
FIG. 6 is a media-facing view of a sensor connected to lead and bias layers and separated from magnetic shields by t-aC read gaps.
Figure 7:
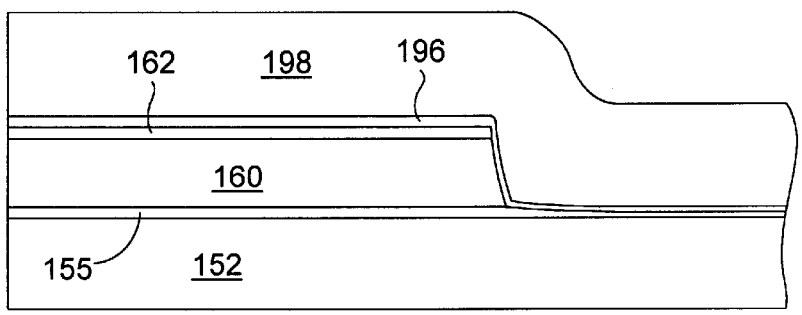
FIG. 7 is a cross-sectional view of the sensor, shields and t-aC read gaps of FIG. 6.

FIG. 6 shows another steeply sloped border 190 for the sensor layers 160, a hard bias layer 192 and a conductive layer 194 that have been formed, while mask layers 175 and 177 have been etched away, lifting off in the process any part of layers 192 and 194 that were atop the mask. Another layer 196 of hydrogen-free tetrahedral carbon is then formed by cathodic arc deposition, creating a read gap either alone or in combination with layer 162. Read gap layers 162 and 196 may be formed with a lower bias than that used to form read gap 155, to avoid damage to delicate sensor layers 160. A second shield 198 is then formed, which most commonly includes NiFe formed by sputtering and electroplating. The view of the sensor layers 160 and other layers depicted in FIG. 6 is essentially that which would be seen from the media, although a coating of t-aC may be formed on the media-facing side to protect the sensor. The sensor layers 160, shield layers 152 and 198, bias layer 192 and conductive layer 194 are all substantially parallel with each other. FIG. 7 is a cross-sectional view of the sensor of FIG. 6, taken along the dashed lines in the direction shown by the double-headed arrow labeled 7. A giant magnetoresistive (GMR) sensor may be formed by adding additional free, pinned and conductive layers to sensor layers 160.

Figure 8:
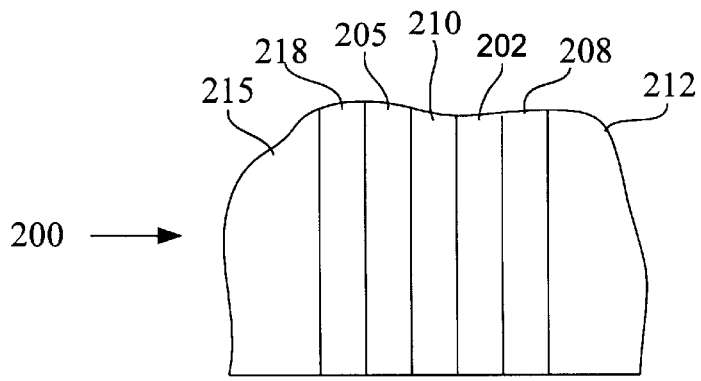
FIG. 8 is a cross-sectional view of an anisotropic magnetoresistive sensor including t-aC sensor and read gaps layers.

In addition to the employing the electrically insulative t-aC layers as read gaps for the spin-valve sensor described above, MR sensors may include t-aC sensor layers for other functions. For example, FIG. 8 shows an anisotropic magnetoresistive (AMR) sensor 200 that uses a soft adjacent layer (SAL) 202 to bias an MR layer 205. Disposed between the SAL layer 202 and the MR layer 205 is a layer of t-aC 210. Also shown are magnetic shields 212 and 215, and read gap layers 218 preferably formed of t-aC. Employment of a thin, approximately 20 Å to 100 Å, defect-free electrically-insulative carbon layer 210 separating the SAL 202 and MR 205 layers reduces current shunting through the SAL layer, which increases the current conducted through the MR layer. This increased current leads to an increased output voltage for a given change in resistance of the MR layer, extending the use of this relatively simple sensor into high-density applications. In an alternative embodiment, layer 202 can carry electrical current that is used to magnetically bias MR layer 205.

Figure 9:
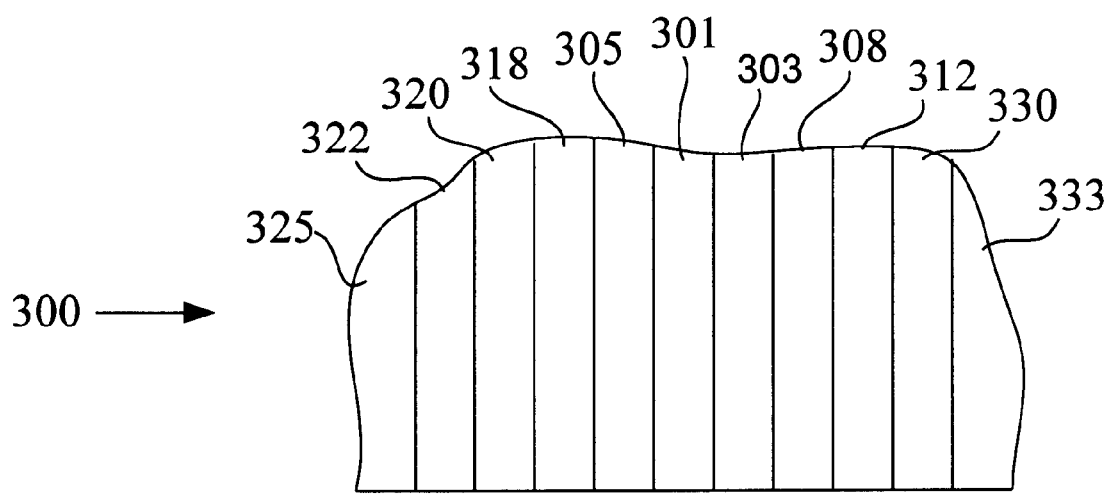
FIG. 9 is a cross-sectional view of a dual stripe magnetoresistive sensor including t-aC sensor and read gaps layers.

FIG. 9 shows a dual stripe magnetoresistive (DSMR) sensor 300 that includes a thin t-aC layer 301 separating a first and second MR layers 303 and 305. A second t-aC layer 308 separates MR layer 303 from a bias layer 312, and a third t-aC layer 318 separates MR layer 305 from its bias layer 320. A fourth t-aC layer 322 separates bias layer 320 from a first magnetic shield 325, while a fifth t-aC layer 330 separates bias layer 312 from a second magnetic shield 333. Reducing the insulating layer 301 thickness separating the two MR stripes 303 and 305, which is provided by the defect and hydrogen-free t-aC employed in the present invention, allows the stripes to more closely read the same bits from the media, which helps with the differential amplification of signal over noise that is a primary advantage of DSMR heads. T-aC layer 301 may have a thickness of from about 100 Å to 500 Å in this embodiment, while other types of DSMR sensors may have a thinner t-aC layer separating the sensors.

While several embodiments of the transducers of the present invention have been illustrated, other implementations of the present invention will become apparent to those of ordinary skill in the art, those implementations falling within the scope of the invention as defined in the following claims.

What is claimed is:

1. A microscopic electromagnetic transducer comprising a plurality of adjoining, substantially parallel solid layers, said adjoining, substantially parallel solid layers including a stack consisting essentially of an electrically conductive layer, a ferromagnetic layer and an electrically insulative layer, each of said electrically conductive layer, said ferromagnetic layer and said electrically insulative layer having a major surface in contact with at least one of the other major surfaces in the stack, said electrically insulative layer containing carbon having tetrahedral bonds and being essentially devoid of hydrogen.

2. The transducer of claim 1 wherein said electrically insulative layer separates said ferromagnetic layer from said electrically conductive layer, such that said electrically insulative layer restricts electrical conduction between said electrically conductive layer and said ferromagnetic layer.

3. The transducer of claim 1 wherein said conductive layer has a resistance that varies in response to a changing magnetic field, and said electrically insulative layer separates said ferromagnetic layer from said conductive layer, such that said electrically insulative layer forms a read gap between said ferromagnetic layer and said electrically conductive layer.

4. The transducer of claim 1 further comprising a second ferromagnetic layer adjoining said electrically conductive layer, wherein said ferromagnetic layers communicate electrons through said conductive layer in an amount that varies in response to a change in applied magnetic field.

5. The transducer of claim 1 wherein said electrically insulative layer has a thickness of less than 500 Å.

6. The transducer of claim 1 wherein said solid layers include plural magnetoresistive layers and said electrically insulative layer is disposed between said plural magnetoresistive layers, such that said transducer is configured as a dual-stripe magnetoresistive sensor.

7. The transducer of claim 1 wherein said electrically insulative layer separates said ferromagnetic layer from said electrically conductive layer, and said transducer further comprises a second ferromagnetic layer that is separated from said electrically conductive layer by a second electrically insulative layer containing carbon having tetrahedral bonds that is essentially devoid of hydrogen, such that said electrically insulative layers restrict electrical conduction between said electrically conductive layer and said ferromagnetic layers.

8. The transducer of claim 1 wherein said solid layers further include an antiferromagnetic layer that is separated from said ferromagnetic layer by said electrically insulative layer.

9. An electromagnetic transducer comprising:

a magnetoresistive sensor, a ferromagnetic layer disposed adjacent to said sensor, and an electrically insulative layer separating said sensor and said ferromagnetic layer, said electrically insulative layer containing carbon atoms interconnected with tetrahedral molecular bonds and being essentially devoid of hydrogen.

10. The transducer of claim 9 wherein said electrically insulative layer has a thickness of less than about 500 Å.

11. The transducer of claim 9 wherein said electrically insulative layer is amorphous.

12. The transducer of claim 9 wherein said electrically insulative layer is polycrystalline.

13. The transducer of claim 9 wherein said ferromagnetic layer is disposed less than one micron from said sensor, wherein said ferromagnetic layer shields said sensor from magnetic fields.

14. The transducer of claim 9 wherein said ferromagnetic layer is a part of a second sensor.

15. The transducer of claim 9 wherein said electrically insulative layer is formed by filtered cathodic arc deposition.

16. The transducer of claim 9 wherein said sensor and said electrically insulative layer are formed in a single chamber.

17. The transducer of claim 9, further comprising a second electrically insulative layer adjoining said sensor distal to said ferromagnetic layer, said second electrically insulative layer containing carbon atoms interconnected with tetrahedral molecular bonds that are essentially devoid of hydrogen.

18. A method of making a transducer comprising the steps of:

forming a layer of ferromagnetic material over a substrate, forming a layer of carbon having tetrahedral bonds that are substantially hydrogen-free, including directing carbon ions toward said layer of ferromagnetic material and filtering particles larger than carbon ions away from said layer of ferromagnetic material, and forming a plurality of sensor layers such that at least one of said sensor layers adjoins said carbon layer, including forming at least one magnetoresistive layer.

19. The method of claim 18, wherein said forming said layer of carbon includes etching said layer of ferromagnetic material with carbon ions.

20. The method of claim 18, wherein said forming said layer of carbon includes implanting carbon ions in said layer of ferromagnetic material.

21. The method of claim 18, further comprising forming a second layer of carbon having tetrahedral bonds that are substantially hydrogen-free atop said sensor layers.

22. The method of claim 18, further comprising:

forming a mask over an active area of said sensor layers, removing, by directed etching, a portion of said sensor layers not covered by said mask, including removing said sensor layers at a substantially greater rate than a rate of removal of said carbon layer, thereby forming a blunt end of said sensor layers and a shallow slope to said carbon layer, forming a metal layer adjoining said end and said carbon layer, and removing said mask.

23. The transducer of claim 1 wherein said electrically insulative layer is formed by filtered cathodic arc deposition.

* * * * *